United States Patent [19]

Kato

[11] Patent Number: 5,553,423
[45] Date of Patent: Sep. 10, 1996

[54] MOLDING FOR FRONT GLASS FOR VEHICLES

[75] Inventor: Katsuhisa Kato, Kitasouma-gun, Japan

[73] Assignees: Tokiwa Chemical Industries Co., Ltd., Chiba; System Technical Co., Ltd., Ibaragi, both of Japan

[21] Appl. No.: 373,463

[22] Filed: Jan. 17, 1995

Related U.S. Application Data

[63] Continuation of Ser. No. 683,175, Apr. 9, 1991, abandoned.

[30] Foreign Application Priority Data

Nov. 19, 1990  [JP]  Japan ................................ 2-313464
Nov. 27, 1990  [JP]  Japan ................................ 2-124562

[51] Int. Cl.$^6$ ............................. F06B 3/00; B60R 13/06
[52] U.S. Cl. .................... 52/204.597; 52/716.5; 52/717.01; 52/208; 52/204.591; 296/93
[58] Field of Search ....................... 52/716.5, 717.01, 52/788, 208, 204.591, 204.597; 296/93, 146.5, 208; 49/490, 491, 495

[56] References Cited

U.S. PATENT DOCUMENTS

| | | | |
|---|---|---|---|
| 2,612,972 | 10/1952 | Heimgartner et al. | 52/716 |
| 3,274,740 | 9/1966 | Hall | 52/400 |
| 3,694,984 | 10/1972 | Schwartz | 52/401 |
| 4,712,826 | 12/1987 | Omori | 52/208 |
| 4,757,659 | 7/1988 | Miyakawa et al. | 296/93 |
| 4,757,660 | 7/1988 | Miyakawa et al. | 296/93 |
| 4,884,380 | 12/1989 | Yada et al. | 296/93 X |
| 4,963,403 | 10/1990 | Roberts et al. | 52/716 |
| 5,028,460 | 7/1991 | Kimura et al. | 296/93 X |
| 5,032,444 | 7/1991 | Desir, Sr. | 52/716 |
| 5,107,646 | 4/1992 | Tamura | 296/93 X |

FOREIGN PATENT DOCUMENTS 2217375  10/1989  United Kingdom .................... 296/93

Primary Examiner—Carl D. Friedman
Assistant Examiner—Winnie Yip
Attorney, Agent, or Firm—Wenderoth, Lind & Ponack

[57] ABSTRACT

A front glass molding for a vehicle is interposed between a body panel and a glass panel of a front glass portion of the vehicle. This molding comprises a head molding and first and second legs. The first leg is inserted in the head molding at left and right side sections of the molding and the second leg is inserted into the head molding at an upper section of the molding to securely and easily fix the glass panel to the body panel.

6 Claims, 7 Drawing Sheets

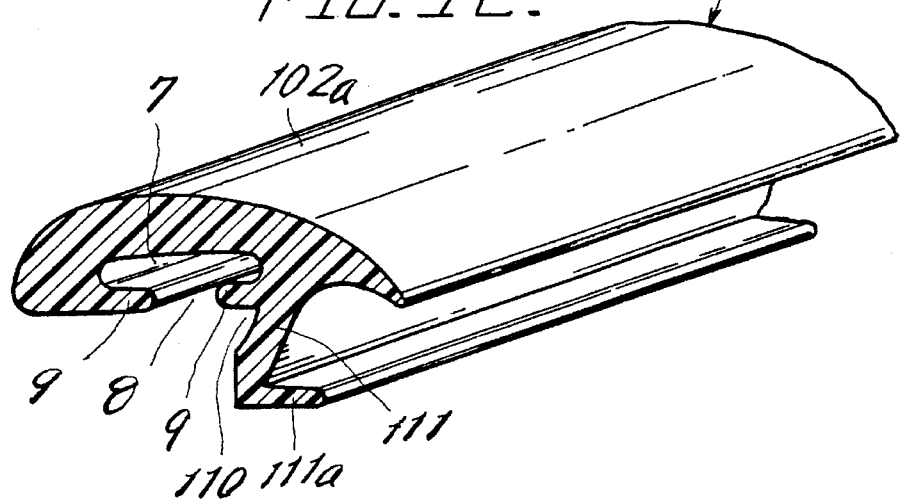
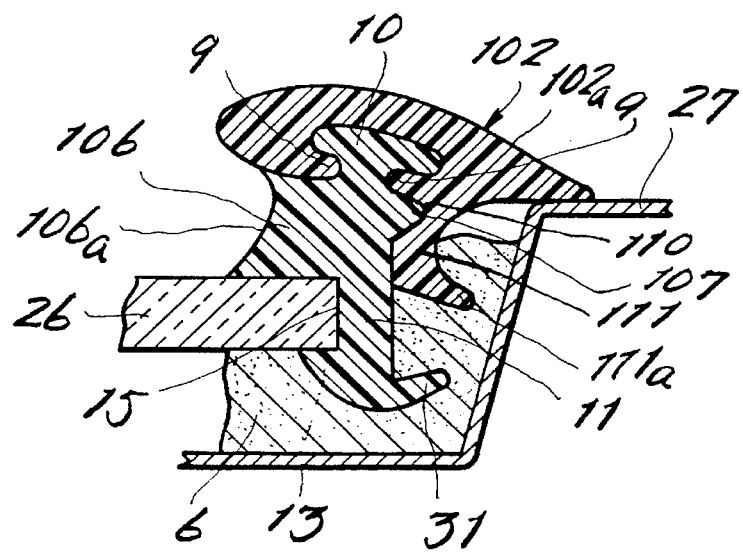
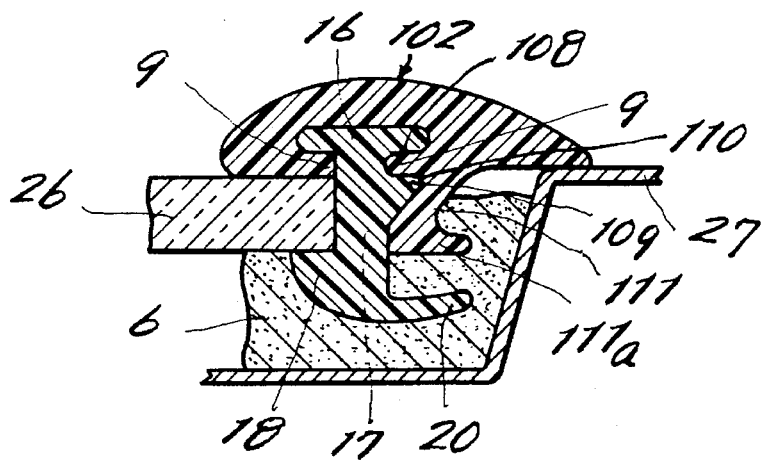

MOLDING FOR FRONT GLASS FOR VEHICLES

This application is a continuation of now abandoned application Ser. No. 07/683,175, filed on Apr. 9, 1991, now abandoned.

BACKGROUND OF THE INVENTION

1. Field of the Invention

This invention relates to a molding for a vehicle front glass interposed between a body panel and a glass panel in the front glass portion of an automobile, etc. More particularly, the invention relates to a molding comprising a head molding combined with two kinds of a first and a second leg for easily constituting side sections and an upper section of the molding.

2. Description of the Prior Art

Conventionally, there have been proposed and practically employed a variety of front glass moldings. The publicly known front glass molding comprises left and right side sections having lower grooves for receiving side edges of the glass panel and upper grooves for guiding rainwater to prevent rainwater from leaking into the driver's room of the vehicle. However, in the prior art front glass molding, the side sections having the two grooves cannot be employed for the upper section of the front glass, so the molding side sections have to be connected by corner joints to a molding upper section having a separate cross-sectional shape and formed separately from the side section. Therefore, it is complicated to form the prior art front glass moldings due to the three different types of components. Furthermore, the prior art molding has the drawback that the left and right side sections thereof tend to be curved or moved by pressure due to rain and wind since the side portions are projected substantially above the glass panel. In addition, the corner joints make the external appearance of the front glass portion of the vehicle look ugly and are easily broken.

SUMMARY OF THE INVENTION

Therefore, it is a main object of this invention to provide a front glass molding for a vehicle, wherein the molding comprises a head molding, a first leg having a rainwater guiding means and a glass panel inserting groove, and a second leg, so that the constitution is simplified and the molding can be easily and securely assembled.

It is another object of this invention to provide a front glass molding which can give a pleasing external appearance to the head portion of the vehicle, since only the head molding is exposed on the body panel.

It is a furthermore object of this invention to provide a front glass molding for a vehicle, wherein a reinforcing metal piece is embedded into the first leg to oppose the pressure of the rainwater and wind, and rigidify the molding.

According to this invention, there is provided a front glass molding for a vehicle, comprising a molding body including three kinds of components. These components include a head molding, a first leg and a second leg. The head molding is provided with engaging projections opposed to an opening formed in the lower surface and a groove connected to the opening. The first leg is provided with a head portion and a leg portion extending perpendicular to the lower direction from the lower surface of the head portion. The leg portion of the first leg is provided at its upper portion with a rainwater guiding means and at its lower portion with a glass panel inserting groove. The second leg is provided with a head portion and a leg portion extending perpendicular to the lower direction from the lower surface of the head portion. The leg portion of the second leg is provided at its lower end with a supporting piece to form a glass panel inserting groove in one side face thereof. In the left and right side sections of the molding, the head portion of the first leg is inserted into the groove in the head molding, and each of side ends of the glass panel is inserted into the glass panel inserting groove. In an upper section of the molding, the head portion of the second leg is inserted into the groove in the head molding and an upper end of the glass panel is inserted between the supporting piece of the second leg and the lower surface of the head molding.

BRIEF DESCRIPTION OF THE DRAWINGS

This invention is illustrated by way of example in the accompanying drawings in which:

FIG. 12 a perspective view of another embodiment of the head molding;

FIG. 13 is a cross-sectional view of the combination of the head molding and the first leg shown in FIG. 8 taken along line 6—6 of FIG. 1;

FIG. 14 is a cross-sectional view of the combination of the head molding shown in FIG. 12 and the second leg shown in FIG. 9 taken along line 7—7 of FIG. 1;

DESCRIPTION OF THE PREFERRED EMBODIMENTS

Figure 1:
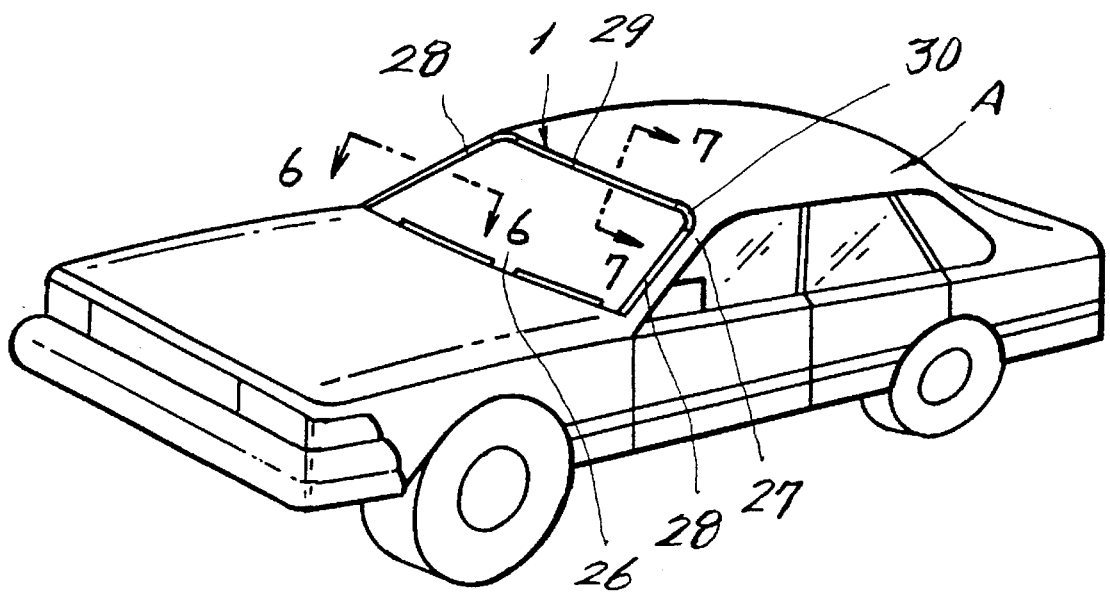
FIG. 1 is a perspective view of an automobile in which a front glass molding of this invention is mounted.

This invention will be now described with reference to the preferred embodiments shown in the accompanying drawings.

Reference numeral 1 denotes a molding body. Said molding body 1 is interposed between a body panel 27 and a glass panel 26 of the front portion of an automobile A.

The molding body 1 comprises three kinds of components including a head molding 2 formed by extruding a synthetic resin in a longitudinal direction; a first leg 3 having a groove 15 for receiving the glass panel 26; an intermediate projection 12 for pressing against the glass panel 26 and a rainwater guiding groove 14; and a second leg 4 having a groove 19 for receiving the glass panel 26.

The head molding 2 is provided at its upper surface with a head portion 2a, and at its lower surface with a longitudinal groove 7 in various shapes along the longitudinal direction. The groove 7 opens through the lower surface by a longitudinal opening 8 which is formed along the longitudinal direction in the lower surface of the head portion 2a. Engaging projections 9, 9 are formed on opposite sides of the longitudinal opening 8.

The first leg 3 is provided at its upper portion with a head portion 10 which is inserted into the longitudinal groove 7 of the head portion 2a, and a perpendicular leg portion 11 is integrally formed with and extends downwardly from the head portion 10. The leg portion 11 is provided with the intermediate projection 12 on one side, such that the groove 14 for guiding rainwater is defined between the lower surface of the head portion 10 and the upper surface of the intermediate projection 12 on one side of the first leg 3. At the lower end of the leg portion 11, supporting piece 13 is provided to form the glass panel receiving groove 15 between the lower surface of the intermediate projection 12 and the upper surface of the supporting piece 13. Formed on the opposite side of the leg portion 11 from the supporting piece 13 is a holding piece 31 which is embedded into an adhesive 6 in use.

Figure 4:
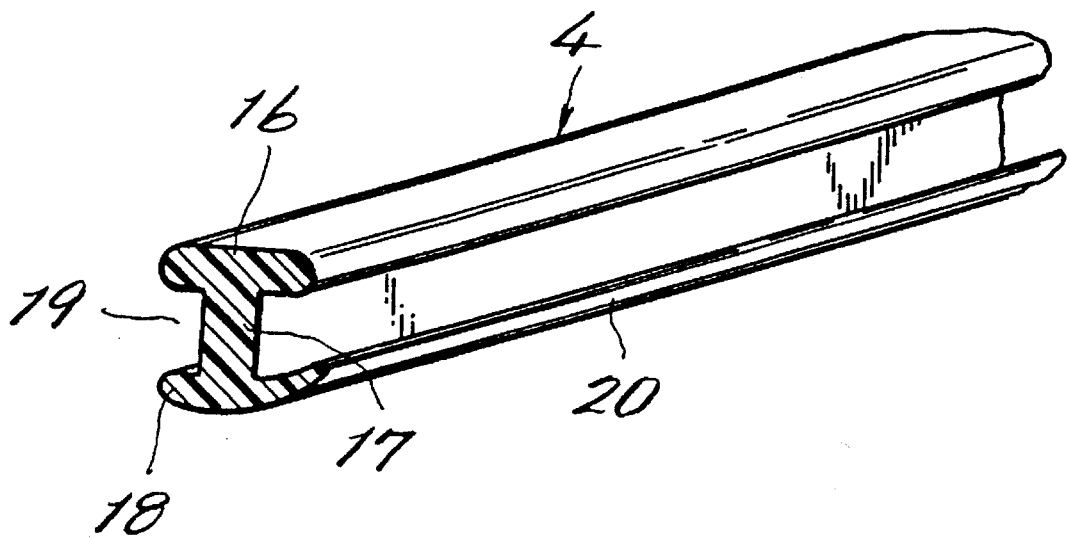
FIG. 4 is a perspective view of a second leg of the molding.

The second leg 4 shown in FIG. 4 is provided at its upper portion with a longitudinal head portion 16 which is inserted into the longitudinal groove 7 of the head portion 2a, and is provided at its lower portion with a leg portion 17 which is provided at its lower end with the supporting piece 18 to form the groove 19 for receiving an end of the glass panel 26 between the lower surface of the head portion 16 and the upper surface of the supporting piece 18 on one side of the leg portion 17.

Formed on the opposite side of the leg portion 17 from the supporting piece 18 is a holding piece 20 which is embedded into the adhesive 8 and is fixedly supported in use.

Figure 5:
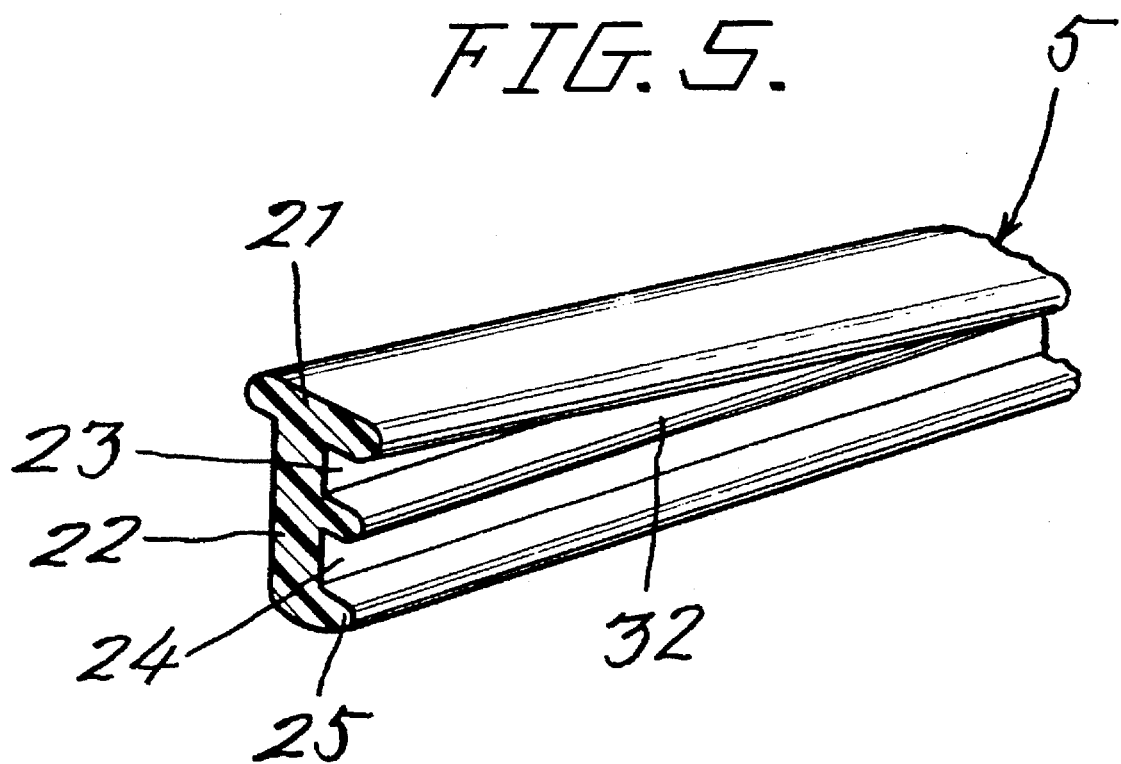
FIG. 5 is a perspective view of a connecting leg.

FIG. 5 illustrates a corner leg 5 to use in corner sections of the molding as occasion demands. The corner leg 5 is formed of a flexible material such as a flexible synthetic resin. The corner leg 5 is provided at its upper portion with a head portion 21 which is inserted into the groove 7 of the head portion 2a, and a perpendicular leg portion 22 is formed integrally with and extends downwardly from the head portion 21. This leg portion 22 is formed as a slant form toward the longitudinal direction and is provided at one side face with a projection 32 to form a rainwater guiding groove 23 inclined in the longitudinal direction between the lower surface of the head portion 21 and the upper surface of the projection 32, and is provided at its lower end with a supporting piece 25 to form a glass panel receiving groove 24 for receiving an end of the glass panel 26 between the lower surface of the projection 32 and the upper surface of the supporting piece 25. This corner leg 5 can be connected integrally to the first leg 3 and can be employed by uniting it with the first leg 3.

Figure 6:
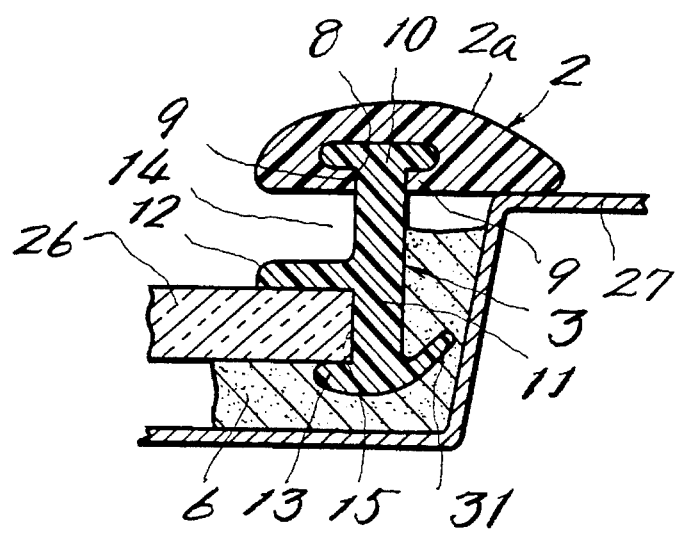
FIG. 6 is a cross-sectional view of the combination of the head molding and the first leg taken along line 6—6 of FIG. 1.

In molding side sections 28, 28 to the left and right of the glass panel 26, as shown in FIG. 6, the head portion 10 of the first leg 3 is engaged in the concave groove 7 in the head portion 2a, the side edge of the glass panel 26 is inserted into the groove 15 formed between the intermediate projection 12 and the supporting piece 13, and the rainwater guiding groove 14 is formed between the lower surface of the head portion 2a engaged with the head portion 10 of the first leg 3 and the upper surface of the intermediate projection 12. The side sections of the molding body 1 are fixed to the body panel 27 with the adhesive 6.

Figure 7:
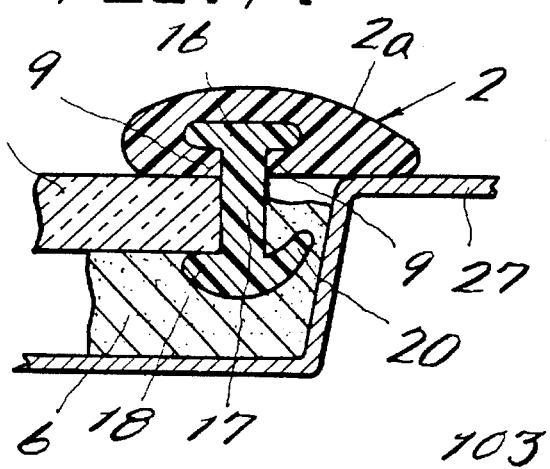
FIG. 7 is a cross-sectional view of the combination of the head molding and the second leg taken along line 7—7 of FIG. 1.

In an upper section 29 of the front glass molding, as shown in FIG. 7, the head portion 16 of the second leg 4 is engaged in the concave groove 7 in the head portion 2a, and an upper end of the glass panel 26 is inserted into the glass panel inserting groove 19 formed between lower surface of the head portion 2a engaged with the head portion 16 of the second leg 4 and the upper surface of the supporting piece 18. The upper section 29 of the molding main body 1 is fixed to the body panel 27 with adhesive 6.

In order to accommodate the first legs 3 extending along opposing side edges of the glass panel 26 and the second leg 4 extending along the upper edge of the glass panel 26, the head molding 2 is formed in an inverted U-shape having an upper portion (at 29 in FIG. 1) adapted to extend along the upper edge of the glass panel 26 and opposing side portions (at 28 in FIG. 1) depending from respective ends of the upper portion and adapted to extend along the opposing side edges of the glass panel 26.

Figure 3:
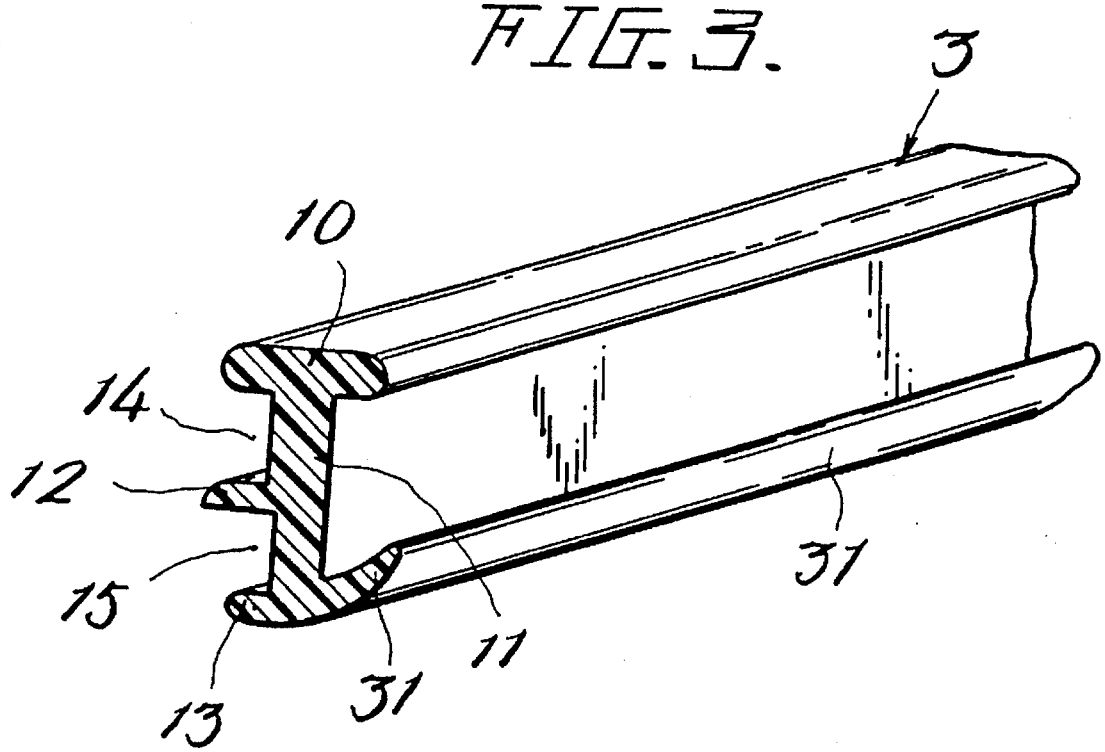
FIG. 3 is a perspective view of a first leg of the molding.
Figure 8:
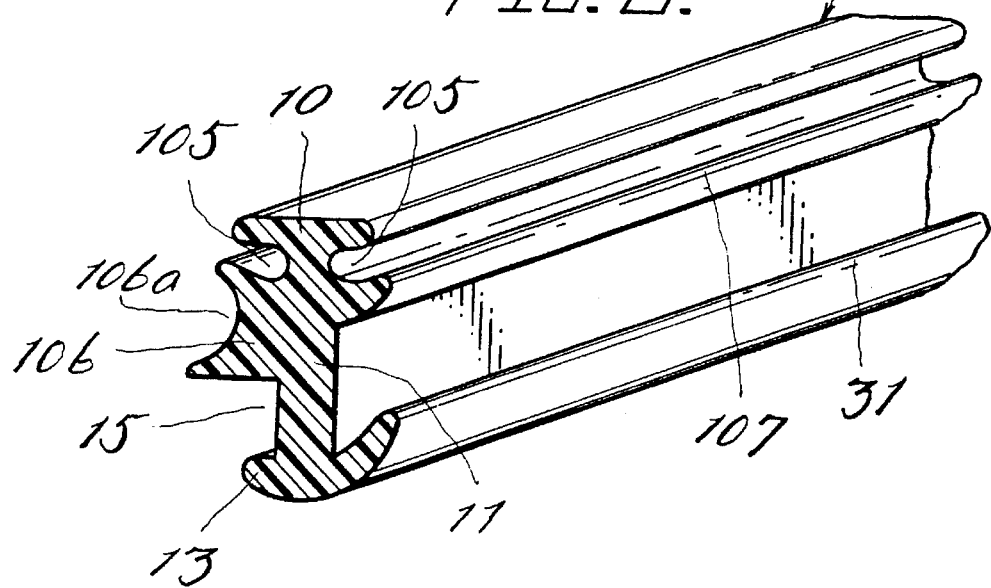
FIG. 8 is a perspective view of another embodiment of the first leg shown in FIG. 3.

FIG. 8 shows a modification of the first leg 3 shown in FIG. 3. As in the FIG. 3 embodiment, a first leg 103 shown in FIG. 8 is provided at its upper end with a head portion 10 which is inserted into the concave groove 7 in the head section 2a, and a perpendicular leg portion 11 is formed integrally and extends downwardly from the head portion 10. A supporting piece 13 and a holding piece 31 are formed at the lower end of the leg portion 11 as in the embodiment shown in FIG. 3. However, the embodiment of FIG. 8 differs from the embodiment of FIG. 3 in that engaging grooves 105, 105 are formed along the longitudinal direction of the leg portion 11 below the head portion 10 for insertion of the engaging projections 9, 9 formed on opposite sides of the head portion 2a. Further, the leg portion 11 is provided at one side with a rainwater guiding ridge 106 having a depression 106a formed in its side face. The depression 106a serves as a rainwater guiding groove in the same manner as groove 14 of the FIG. 3 embodiment. Leg portion 11 is also provided at its other side with an engaging ridge 107 to hold the lower surface of the engaging projection 9 of the head portion 2a inserted into the engaging groove 105.

Figure 9:
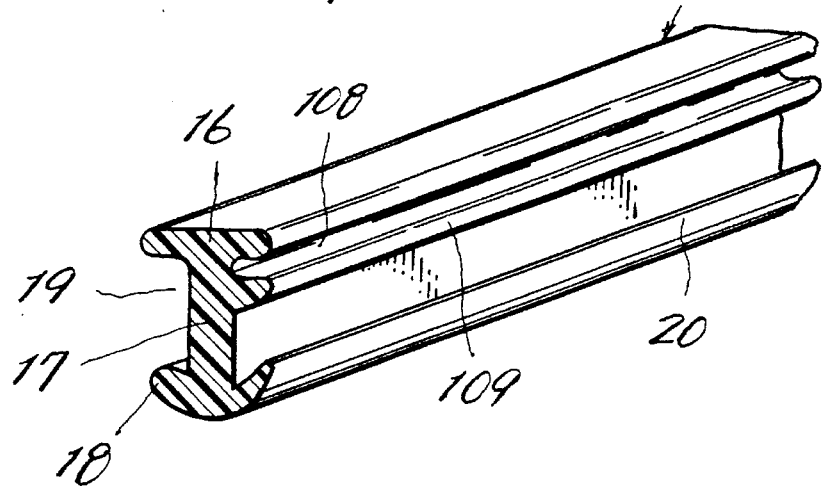
FIG. 9 is a perspective view of another embodiment of the second leg shown in FIG. 3.

FIG. 9 shows a modification of the second leg 4 shown in FIG. 4. As with the embodiment of FIG. 4, a second leg 104 shown in FIG. 9 is provided at its upper portion with a longitudinal head portion 16 and is provided with a perpendicular leg portion 17 extending downwardly from the head portion 16. The leg portion 17 has a groove 19 formed at one side thereof for insertion of an upper edge of the glass panel 26 and has a supporting piece 18 and a holding piece 20 at the lower end, as in the embodiment of FIG. 4.

However, in the second leg 104 shown in FIG. 9, an engaging groove 108 is formed below the head portion 16 on a side of the leg portion 17 opposite the groove 19 for insertion of the engaging projection 9 of the head portion 2a. This engaging groove 108 is defined from below by an engaging ridge 109 to prevent the engaging projection 9 and thus the head portion 2a from movement.

Figure 10:
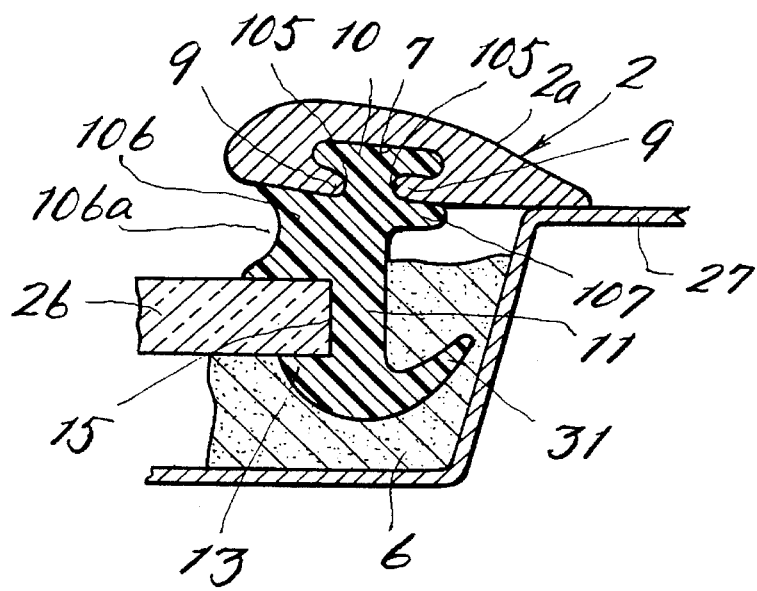
FIG. 10 is a cross-sectional view of the combination of the head molding and the first leg shown in FIG. 8 taken along line 6—6 of FIG. 1.

In the left and right side sections 28, 28 of the molding body 1 employing the first leg 103 shown in FIG. 8, the head portion 10 of the first leg 103 is inserted into the groove 7 of the head portion 2a as shown in FIG. 10, the engaging projections 9, 9 are inserted into the engaging grooves 105, 105, and each of the side edges of the glass panel 26 is inserted into the glass panel inserting groove 15 formed between the rainwater guiding ridge 106 having the rainwater guiding depression 106a at its tip end surface and the supporting piece 13 formed at the lower end of the leg portion 11. The side sections 28, 28 of the molding main body 1 are fixed to the body panel 27 with the adhesive 6.

Figure 11:
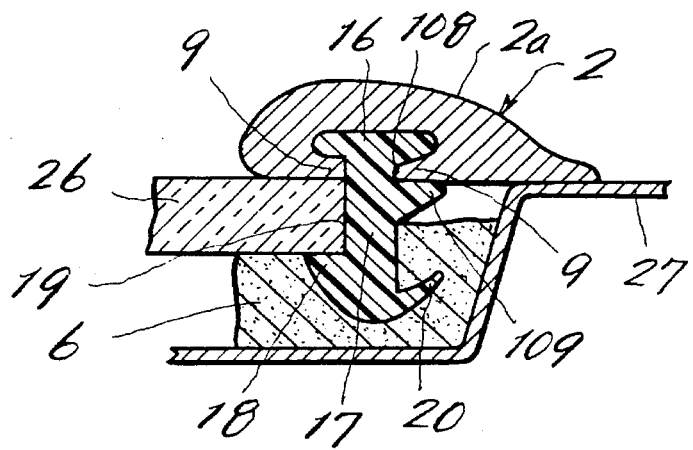
FIG. 11 is a cross-sectional view of the combination of the head molding and the second leg shown in FIG. 9 taken along line 7—7 of FIG. 1.

In the upper section 29 of the molding body 1 employing the second leg 104 shown in FIG. 9, the head portion 16 of the second leg 104 is inserted into the groove 7 of the head portion 2a as shown in FIG. 11, the engaging projection 9 is inserted into the engaging groove 108 formed below the head portion 16, and the upper end of the glass panel 26 is inserted in the glass panel receiving groove 19 above the supporting piece 18. The upper section 29 of the molding body 1 is fixed to the body panel 27 with the adhesive 6.

Figure 2:
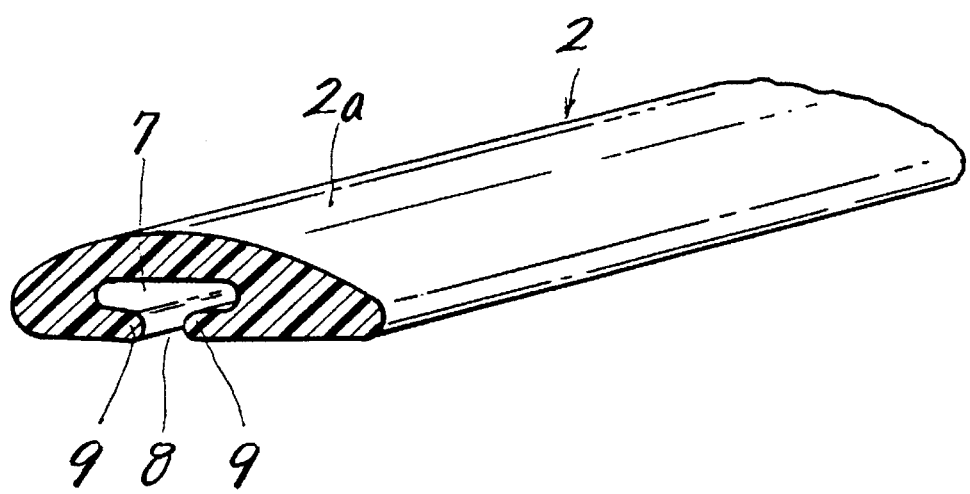
FIG. 2 is a perspective view of a head molding.

FIG. 12 illustrates a modification of the head molding 2 shown in FIG. 2. A head molding 102 is provided with a longitudinal groove 7 in a head portion 102a which opens through the lower surface of the head portion 102a by way of a longitudinal opening 8 connected with the groove 7. Engaging projections 9, 9 are formed on opposite sides of the longitudinal opening 8. The head portion 102a is provided with a leg piece 111 extending downwardly from one of the engaging projections 9. Formed between the one engaging projection 9 and the leg piece 111 is an engaging notch 110, into which the engaging ridge 107 shown in FIG. 8 or the engaging ridge 109 shown in FIG. 9 is to be inserted as shown in FIG. 13 and FIG. 14. The supporting leg piece 111 is provided at its lower end with a lip 111a which is extended substantially in parallel with the lower surface of the head portion 2a and which is embedded into the adhesive 6 in use.

In the left and right side sections 28, 28 of the molding body 1 employing the head molding 102 shown in FIG. 12 and the first leg 103 shown in FIG. 8, the head portion 10 of the first leg 103 is inserted into the groove 7 formed in the head portion 102a of the head molding 102 as shown in FIG. 13, the engaging projections 9, 9 are inserted into the engaging grooves 105, the rainwater guiding depression 106a is provided in the side of the rainwater guiding ridge 106, and each of the side edges of the glass panel 26 is inserted in the glass panel inserting groove 15 between the rainwater guiding ridge 106 and the supporting piece 13. Also, an engaging ridge 107 of the first leg 103 is inserted into the engaging notch 110 formed between one of the engaging projections 9 and the leg piece 111 of the head molding 102. Each side sections 28, 28 of the molding body 1 is fixed to the body panel 27 with the adhesive 6, in use.

In the upper section 29 of the front glass molding using the head molding 102 shown in FIG. 12 and the second leg 104 shown in FIG. 9, the head portion 16 of the second leg 104 is inserted in the groove 7 formed in the head portion 102a of the head molding 102, and the engaging projection 9 is engaged in the engaging groove 108 formed in the lower side of the head portion 16 of the second leg 104. The engaging ridge 109 formed below the engaging groove 108 is inserted in the engaging notch 110 formed below one of the engaging projections 9, and the upper edge of the glass panel 26 is inserted into the glass panel receiving groove 19 formed between the lower surface of the other engaging projection 9 of the head molding 102 and the supporting piece 18 of the second leg 104. The upper section of the molding body 1 is fixed to the body panel 27 with the adhesive 6, in use.

Figure 15:
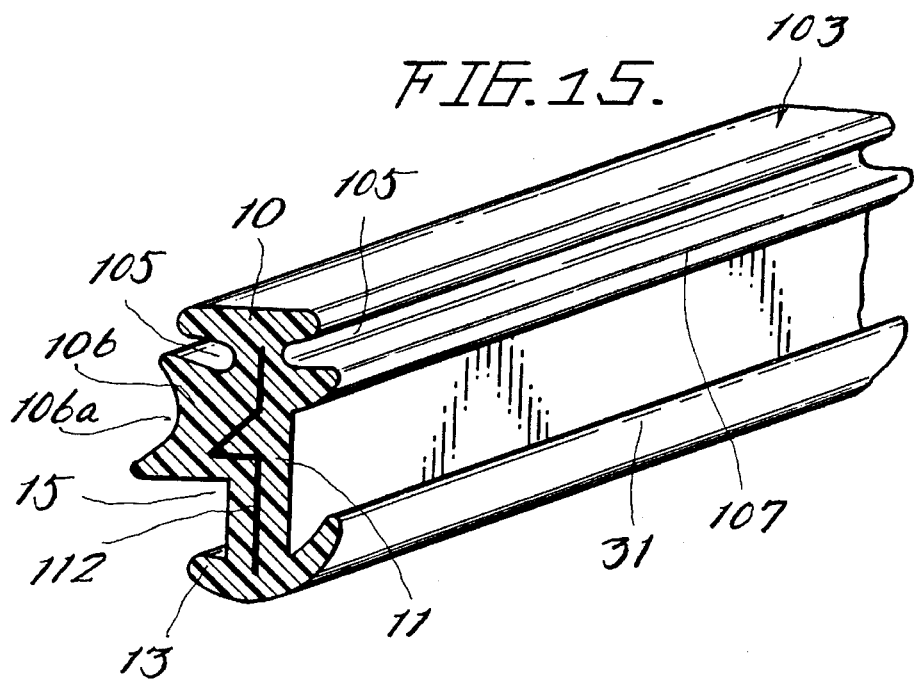
FIG. 15 is a perspective view of a first leg having a reinforcing metal piece.

FIG. 15 illustrates another embodiment of a first leg 103, wherein a reinforcing metal piece 112 is embedded perpendicularly into the leg portion 11 of the first leg 103 shown in FIG. 8 to increase the strength of the inside of the first leg 103. This provides remarkable rigidity and a higher resistance force against rainwater and wind force.

Figure 16:
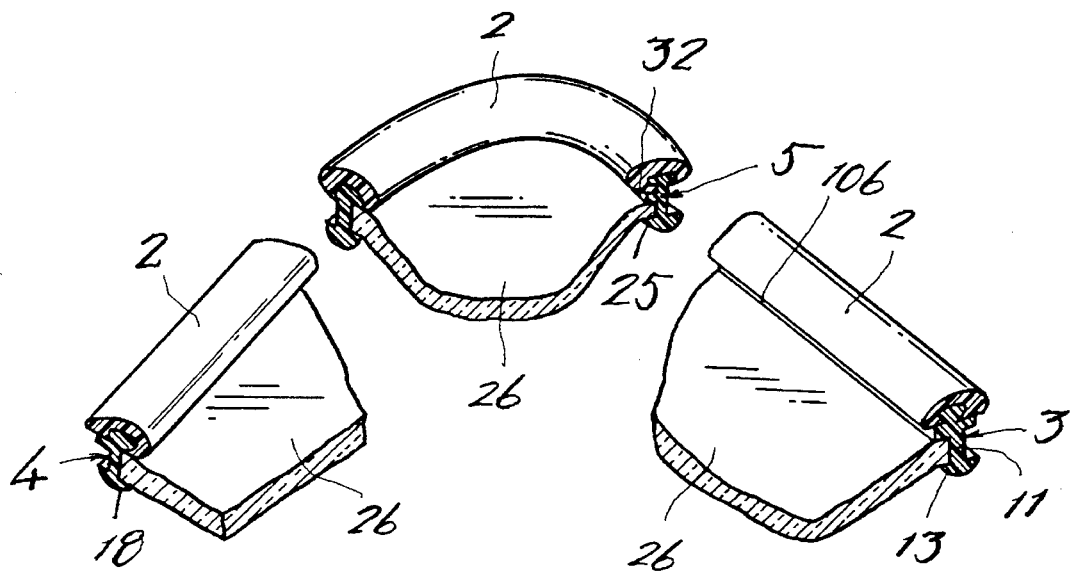
FIG. 16 is a partially cut-away perspective view of the corner section of the molding.

FIG. 16 shows the glass panel 26 partially cut away at portions of the side section 28, the corner section 30 and the upper section 29 of the molding body 1.

According to the molding body of this invention, the left and right side sections of the molding have left and right rainwater guiding means, and the upper section of the molding does not have a rainwater guiding means. These sections can be easily and securely assembled by providing three kinds of components including a head molding, a first leg and a second leg. With this molding, a glass panel can be more securely held in position. Since each component of the head molding, the first leg and the second leg can be molded by extruding a synthetic resin, they can be easily produced and can use material suitable for various objectives. In addition, only one type of head molding is exposed on the surface of the body panel in the front portion of the vehicle, and thus the molding interposed between the glass panel and the body panel can have a pleasing external appearance to the front portion of the vehicle. Furthermore, the molding can be easily and securely assembled by inserting the head portion of the first leg of the side sections of the molding and the head portion of the second leg of the upper section of the molding into the groove opening through the lower surface of the head molding.

While preferred embodiments of the invention have been shown and described in detail, it will be understood that these embodiments are for illustration purpose only and are not to be taken as limiting the invention, which is defined in the appended claims.

What is claimed is:

1. A front glass molding for a vehicle front glass having opposing side edges each of a first given length, and an upper edge of a second given length, said front glass molding comprising:

a pair of first legs adapted to be disposed on the opposing side edges of the front glass, respectively;

a second leg adapted to be disposed on the upper edge of the front glass;

a head molding mounted in covering relation to said pair of first legs and said second leg;

wherein each of said pair of first legs, said second leg and said head molding are separate and discrete components;

wherein each of said first legs includes a head portion and a leg portion extending perpendicularly and downwardly from said head portion, said leg portion of each of said first legs having a rainwater guiding means formed at an upper end of a first side face thereof for guiding rainwater along said front glass molding, and a glass panel receiving groove defined at a lower end of said first side face thereof;

wherein said second leg includes a head portion and a leg portion extending perpendicularly and downwardly from said head portion, said leg portion of said second leg having a supporting piece formed at a lower end of a first side face thereof such that a glass receiving groove is defined between said supporting piece and said head portion of said second leg;

wherein said head molding has a groove formed longitudinally therealong and opening through a lower surface thereof, and engaging projections are formed on opposing sides, respectively, of said groove and extending toward one another;

wherein said head portions of said first legs and said second leg are inserted into said groove of said head molding;

wherein each of said first legs has a first predetermined length adapted to correspond to the first given length of the opposing side edges of the vehicle front glass;

wherein said second leg has a second predetermined length adapted to correspond to the second given length of the vehicle front glass;

wherein said head molding has a third predetermined length at least corresponding to a total of said first predetermined lengths of said first legs and said second predetermined length of said second leg;

wherein said head molding is formed in an inverted U-shape having an upper portion adapted to extend along the upper edge of the front glass and opposing side portions depending from respective ends of said upper portion and adapted to extend along the opposing side edges, respectively, of the front glass;

wherein said head portions of said first legs are inserted in said groove of said head molding along said opposing side portions of said inverted U-shape of said head molding, respectively, and said head portion of said second leg is inserted in said groove of said head molding along said upper portion of said inverted U-shape of said head molding; and wherein, for each of said first legs, said rainwater guiding means of said leg portion of said first leg comprises a rainwater guiding ridge formed at an upper end of said first side face of said leg portion of said first leg, a rainwater guiding depression being formed along a side face of said rainwater guiding ridge.

2. A front glass molding as recited in claim 1, wherein a first holding piece is formed at a lower end of a second side face of said leg portion of each of said first legs; and a second holding piece is formed at a lower end of a second side face of said leg portion of said second leg.

3. A front glass molding as recited in claim 1, wherein, for each of said first legs:

a first engaging groove is formed on said first side face of said first leg between said head portion and said rainwater guiding ridge of said first leg;

an engaging ridge is formed on a second side face of said first leg, a second engaging groove being defined between said head portion and said engaging ridge of said first leg; and said engaging projections of said head molding are inserted in said first and second engaging grooves, respectively, of said first leg.

4. A front glass molding as recited in claim 1, wherein, for each of said first legs:

a supporting piece is formed at a lower end of said first side face of said leg portion of said first leg; and said glass receiving groove of said first leg is defined between said supporting piece and said rainwater guiding ridge of said first leg.

5. A front glass molding as recited in claim 1, wherein an engaging ridge is formed on the other side face of said leg portion of said second leg, such that an engaging groove is formed on said second side face of said leg portion of said second leg between said engaging ridge and said head portion of said second leg.

6. A front glass molding as recited in claim 5, wherein a holding piece is formed at a lower end of the other side face of said leg portion of said second leg.

\* \* \* \* \*